United States Patent [19]

Yasui et al.

[11] Patent Number: 4,978,329
[45] Date of Patent: Dec. 18, 1990

[54] LIMITED SLIP DIFFERENTIAL

[75] Inventors: Yasuyoshi Yasui; Norihisa Iguchi, both of Toyota, Japan

[73] Assignee: Toyota Jidosha Kabushiki Kaisha, Japan

[21] Appl. No.: 281,345

[22] Filed: Dec. 8, 1988

[30] Foreign Application Priority Data

Dec. 8, 1987 [JP] Japan .................. 62-186843[U]
Mar. 14, 1988 [JP] Japan .................. 63-32670[U]

[51] Int. Cl.$^5$ .............................................. F16H 1/44
[52] U.S. Cl. ...................................... 475/84; 475/223; 475/231
[58] Field of Search ................... 74/711; 475/84, 223, 475/230, 231, 233

[56] References Cited

U.S. PATENT DOCUMENTS

| | | | |
|---|---|---|---|
| 2,778,246 | 1/1957 | Thornton | 74/711 |
| 2,850,922 | 9/1958 | Welsh | 74/711 |
| 3,232,139 | 2/1966 | Nickell | 74/711 |
| 3,362,258 | 1/1968 | Thornton | 74/711 |
| 3,364,791 | 1/1968 | Truckle | 74/711 |
| 3,831,462 | 8/1974 | Baremor | 74/711 |
| 3,874,251 | 4/1975 | Lapitsky et al. | 74/713 |
| 4,163,400 | 8/1979 | Fisher et al. | 74/710 |
| 4,594,913 | 6/1986 | Opitz | 74/711 |
| 4,747,322 | 5/1988 | Orain | 74/715 |

FOREIGN PATENT DOCUMENTS 41038 2/1986 Japan .
140241 8/1986 Japan .

*Primary Examiner*—Dwight Diehl
*Attorney, Agent, or Firm*—Oliff & Berridge

[57] ABSTRACT

A limited slip differential includes a differential case, a pair of side gears formed of spiral bevel gears and disposed in the differential case, a plurality of pinions formed of spiral bevel gears meshing with the side gears, supported by shaft portions of a spider and disposed in the differential case and a frictional force generator by which a differential motion generated between shafts respectively coupled with the side gears is limited. The limited slip differential further includes a member for preventing the spider from wear resulting from such constitution of side gears and pinions that the tooth surfaces on which each of the pinions meshes with the pair of side gears constitute a concave with respect to the tooth of the side gear on one side and a convex with respect to the tooth of the side gear on the other side.

7 Claims, 5 Drawing Sheets

LIMITED SLIP DIFFERENTIAL

BACKGROUND OF THE INVENTION

1. Field of the Invention

This invention relates to a limited slip differential and, more particularly, to a limited slip differential suitable to be installed on a drive line of an automobile.

2. Description of the Prior Art

There is proposed a differential gear, in which a plurality of pinions formed of spiral bevel gears and a pair of side gears formed of spiral bevel gears and meshing with the pinions are disposed in a differential case, wherein a differential motion generated between shafts respectively coupled with the side gears is limited by frictional force (Japanese Patent Public Disclosure (KOKAI) No. 61-41038, Japanese Utility Model Public Disclosure (KOKAI) No. 61-140241, and U.S. Pat. No. 3,264,900).

In a case of the differential gear using the spiral bevel gears for the side gears and pinions, the tooth surfaces on which the pinions mesh with the left and right side gears constitute a concave with respect to the side gear on one side and a convex with respect to the side gear on the other side.

Since the tooth surfaces of each pinion meshing with the teeth of the left and right side gears differ from each other, on a position where the concave surface of the pinion meshes with the tooth of the side gear acts such a force to direct from the side gear to the pinion in a direction of keeping the pinion away from the side gear, while on a position where the convex surface of the pinion meshes with the tooth of the side gear acts such a force to direct from the side gear to the pinion in a direction of bringing the pinion close to the side gear. As a result, such a moment to urge the pinion to rotate is generated in a plane including points of contact between the pinion and the left and right side gears and axes of the side gears.

In the differential gear disclosed in the Japanese Patent Public Disclosure (KOKAI) No. 61-41038 as noted above, a surface of each of the pinions opposed to the differential case is formed into a spherical surface and the differential case has a concave spherical surface. Therefore, the pinion will receive directly the moment as noted above. The pinion is supported by a shaft portion of a spider and has no possibility of rotating in a circumferential direction in the plane in practice. In this state, an abnormal tooth contact between the pinion and the side gears is generated due to the moment applied to the pinion, thus resulting in degradation of the strength of the teeth. Further, a strong edge load is applied to a portion where the shaft portion of the spider is fitted in the differential case to result in occurrence of abnormal wear.

The fact that the tooth surfaces on which the pinions mesh with the left and right side gears constitute the convex surface with respect to the tooth surfaces of the side gear on one side and the concave surface with respect to the tooth surfaces of the side gear on the other side means, in other words, that a large thrust load is generated on the side gear on one side while a small thrust load is generated on the side gear on the other side. At this time, loads of the same magnitude as the thrust loads applied to the left and right side gears and having the opposite directions to the thrust loads are generated on the pinion in accordance with balancing of the forces. Then, a load corresponding to a difference between the loads acts on the shaft portion of the spider supporting the pinion. Thus, it is liable to give uneven wear to the spider shaft portion.

SUMMARY OF THE INVENTION

It is an object of the present invention to overcome the above problems resulting from such constitution of pinions and side gears that the tooth surfaces on which the pinions mesh with the teeth of the left and right side gears constitute a convex with respect to the tooth of the side gear on one side and a concave with respect to the tooth of the side gear on the other side.

Another object of the present invention is to provide a limited slip differential which may receive the rotating moment acting on the pinion by a differential case to thereby prevent the degradation of mechanical strength of the teeth and abnormal wear resulting from the abnormal tooth contact.

A further object of the present invention is to provide a limited slip differential including pinions and side gears respectively formed of spiral bevel gears, in which a shaft portion of a spider may be prevented from uneven wear and a large differential limiting force may be generated at the time of driving.

According to the present invention, there is provided a limited slip differential which includes a differential case, a pair of side gears formed of spiral bevel gears and disposed in the case, a plurality of pinions formed of spiral bevel gears meshing with the side gears, supported by shaft portions of a spider and disposed in the case, wherein a differential motion generated between shafts coupled respectively with the side gears is limited by frictional force. The limited slip differential comprises means for preventing wear of the spider and/or gears resulting from such constitution of the pinions and side gears that the tooth surfaces on which the respective pinions mesh with the pair of side gears constitute a concave with respect to the tooth of the side gear on one side and a convex with respect to the tooth of the side gear on the other side.

The teeth of the pair of side gears are formed such as to be twisted in the opposite direction to those of the pinions.

In one aspect of the present invention, the wear preventing means is a member for preventing each pinion from rotating in a plane including points of contact between the pinion and the pair of side gears and axes of the pair of shafts and is disposed between the pinion concerned and the differential case.

In a preferred embodiment, the surface of the rotation preventing member opposed to the pinion is formed as a plane, while another surface thereof opposed to the differential case is formed as a surface having an arc centering around the axes of the pair of shafts. On the other hand, the surface of the differential case opposed to the rotation preventing member is formed as a surface having an arc centering around the axes of the pair of shafts.

The rotating moment applied from the left and right side gears to the pinion is received by the rotation preventing member and the differential case, so that it is possible to prevent the moment from acting on the spider.

In another aspect of the present invention, the wear preventing means is a member disposed between each shaft portion of the spider and the differential case and supporting the spider to be movable in the axial direction of the shafts.

In a preferred embodiment, the support member has an inner peripheral surface generally formed into an elliptical or elongated hole as viewed in a plan. A long axis of the inner peripheral surface extends in the same direction as the axes of the shafts. On the other hand, an end of each shaft portion of the spider is formed to have a generally rectangular section and is inserted into the support member. The end of the shaft portion of the spider is formed such that it is spaced apart from the support member to form gaps in the direction of the long axis of the support member, while it is loosely fitted in the support member in the direction orthogonal to the long axis.

In forward driving, a large thrust load is generated on the side gear meshing with the convex surface of the tooth of each pinion while a small thrust load is generated on the side gear meshing with the concave surface of the tooth of each pinion. Therefore, the spider supporting the pinions is moved in the support member toward the side gear, on which the small thrust load is generated, due to the load corresponding to a difference between the reverse loads generated on each of the pinions resulting from the balance of the forces, and the pinions are then pressed against the side gear, on which the small thrust load is generated.

According to the first aspect of the present invention, the following effects are attained.

No abnormal tooth contact between the pinion and the side gears occurs thereby minimizing degradation of the strength of the teeth.

Since no edge load is applied to a portion where the shaft portion of the spider supporting each of the pinions is fitted in the differential case, abnormal wear is not generated.

According to the second aspect of the present invention, the following effects are attained.

The uneven wear of the spider is prevented and simultaneously the pinions are pressed against the side gear, on which the small thrust load is generated. As a result, the frictional force of the frictional force generating means provided in relation with the side gear as noted above is enlarged to increase the differential limiting force.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
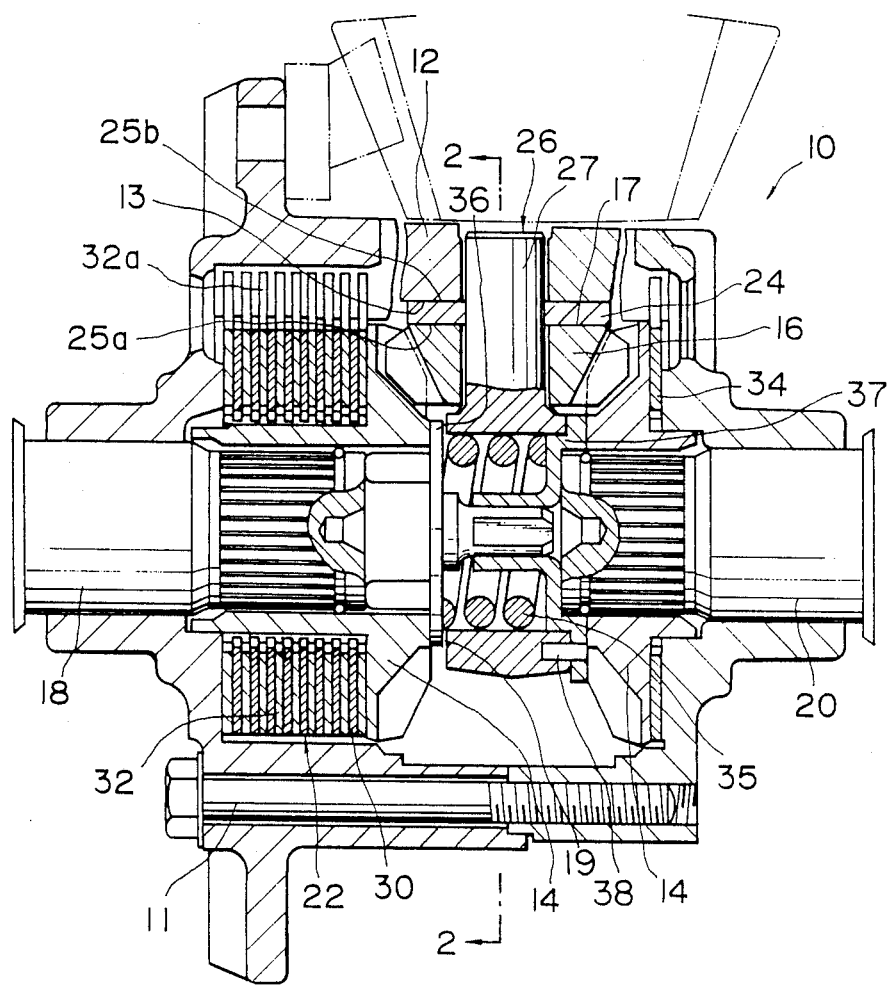
FIG. 1 is a sectional view taken along a line 1—O—1 in FIG. 2 of a limited slip differential.
Figure 2:
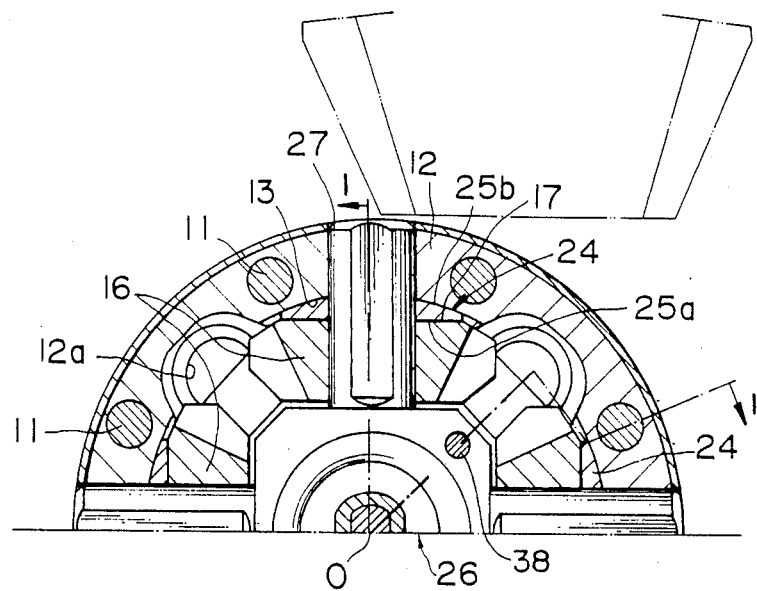
FIG. 2 is a partial sectional view taken along the upper half of a line 2—2 in FIG. 1.
Figure 2A:
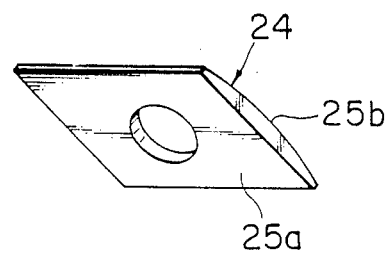
FIG. 2a is a perspective view of a rotation preventing member.

A limited slip differential 10 includes a differential case 12 consisting of two portions and connected with each other through bolts 11, a pair of side gears 14 and a plurality of pinions 16 respectively disposed in the differential case 12 and frictional force generating means 22 by which a differential motion generated between a shaft 18 coupled with one side gear 14 and a shaft 20 coupled with the other side gear 14 is limited. The side gears 14 are coupled unrotatably and axially slidably to the shafts 18, 20. The limited slip differential also includes means 24 for preventing the pinions 16 from rotating.

Both of the side gears 14 and the plurality of pinions 16 are formed of spiral bevel gears. In this case, when the teeth of each of the side gears 14 are twisted in left-hand thread, for example, the teeth of each of the pinions 16 are twisted in right-hand thread. The plurality of pinions (four in the embodiment shown) 16 are rotatably supported respectively by shaft portions 27 of a spider 26 disposed at intervals of 90° in a circumferential direction and extending orthogonally to axes of the shafts 18, 20. The pair of side gears 14 mesh with the plurality of pinions 16. In a case of providing two pinions 16, these pinions are supported by both ends of a single shaft. The spider used in this specification also means a spider which includes such a single straight shaft.

The frictional force generating means 22 may be of the configuration usually used. In the embodiment shown, however, this means 22 has the constitution which will be later described for achieving the preferred effects.

The rotation preventing means 24 prevents each pinion 16 from rotation in a plane including points of contact between the pinion 16 concerned and the pair of side gears 14 and axes of the pair of shafts 18, 20 and is disposed between each pinion 16 and the differential case 12.

In the embodiment shown, a thrust washer or a member is used for the rotation preventing means 24 having an inner surface 25a formed as a plane opposed to the pinion 16 and an outer surface 25b opposed to the differential case 12. The outer surface 25b has an arc centering around the axes of the shafts 18, 20 to be formed as a plane ranging the arc axially. On the other hand, the surface 17 of the pinion 16 opposed to the rotation preventing means 24 is formed as a plane and the surface 13 of the differential case 12 opposed to the rotation preventing means 24 has an arc centering around the axes of the shafts 18, 20 to be formed as a plane ranging the arc axially.

When the rotation preventing member 24 is disposed between the pinion 16 and the differential case 12, the inner surface 25a of the member 24 is in close contact with the opposed surface 17 of the pinion 16 while the outer surface 25b is in close contact with the opposed surface 13 of the differential case 12. As a result, when a rotating moment resulting from a difference in the tooth surfaces on which the pinions 16 mesh with the left and right side gears 14 acts on the pinions 16, the rotating moment is transmitted through the rotation preventing means 24 to the differential case 12 and then received by the differential case 12. Thus, it is possible to prevent the pinion 16 from being pinched to the shaft portion 27 of the spider 26, or to prevent an edge load from acting on a portion where the shaft portion 27 of the spider 26 is fitted in the differential case 12.

When the outer surface 25b of the rotation preventing member 24 is formed as a surface having an arc and the opposed surface 13 of the differential case 12 is formed as a surface having an arc, the opposed surface 13 of the differential case 12 may be worked as a portion of a through hole centering around the axes of the shafts 18, 20 to improve the workability.

The frictional force generating means 22 is constituted from a plurality of clutch plates 30 disposed on the left side of the left side gear 14 and engaging unrotatably and axially movably an outer spline provided on the side gear 14, a plurality of thrust washers 32 disposed on the left side of the left side gear 14, each having a plurality of protrusions 32a which engage unrotatably and axially movably a plurality of recesses 12a provided in the differential case 12 and a thrust washer 34 disposed on the right side of the right side gear 14 and engaging unrotatably and axially movably the plurality of recesses provided in the differential case 12. A coil spring 35 disposed in the spider 26 adds preload to the plates 30 and washers 32 through a plate 36 and the left side gear 14 on one hand and to the washer 34 through a receiver 37 which is connected by pins 38 with the spider and the right side gear 14 on the other hand. The plates 36 and the receiver 37 are connected with each other unrotatably and axially movably. The spider can move within a clearance 19.

As shown in the embodiment, since the number of frictional surfaces formed of the clutch plates and thrust washers disposed on the left side is larger than that on the right side, the differential limiting frictional force at the time of forward driving is far larger than that at the time of engine braking, as will be later described.

Figure 3:
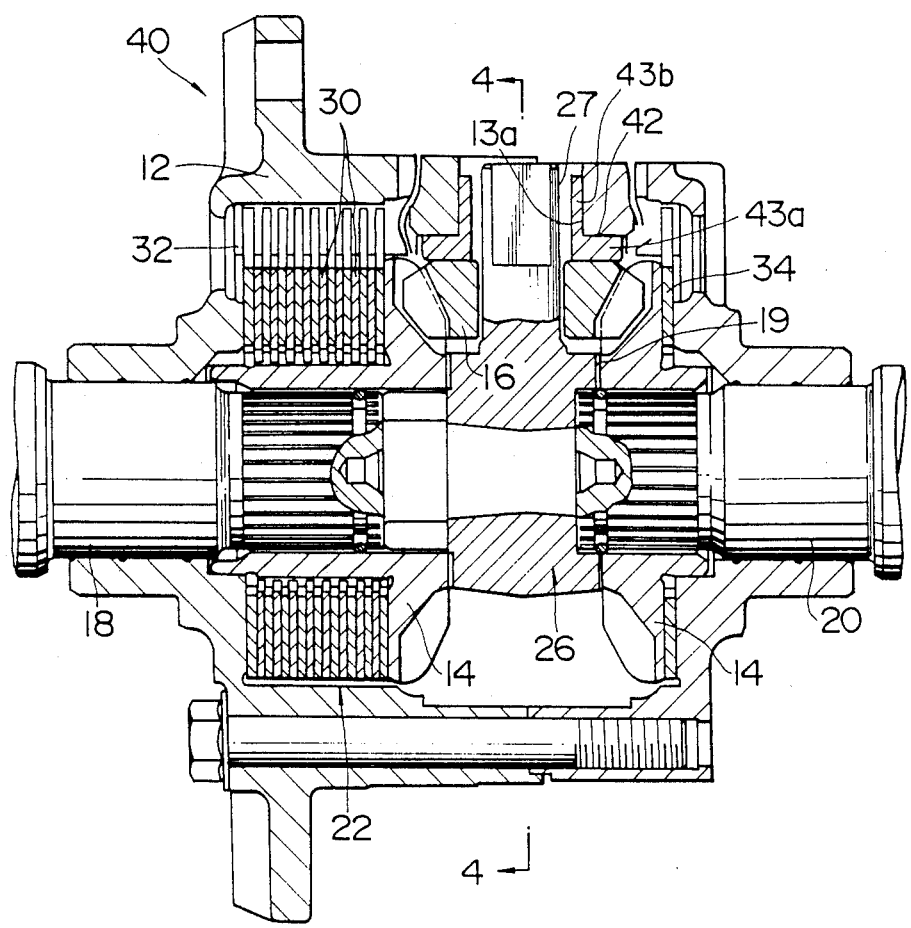
FIG. 3 is a sectional view illustrated in the same manner as in FIG. 1 according to another embodiment of the limited slip differential.
Figure 4:
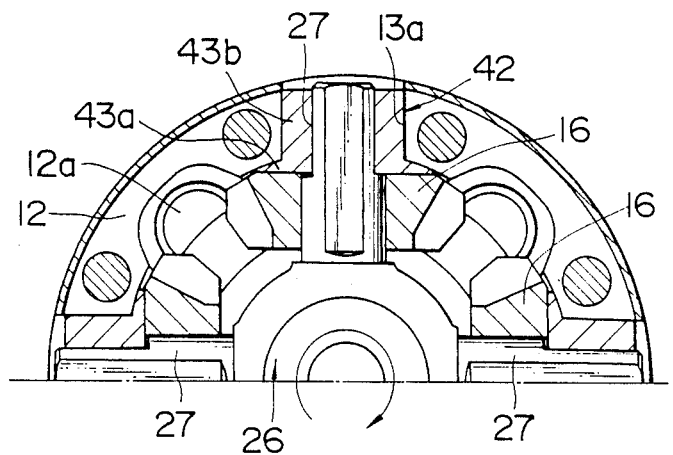
FIG. 4 is a partial sectional view taken along the upper half of a line 4—4 in FIG. 3.

A limited slip differential 40 as shown in Figs. 3 and 4 is the same as the limited slip differential 10 in the basic constitution. Thus, the same symbols are used for the same parts as those in the preceding embodiment to omit the description thereof.

Figure 5:
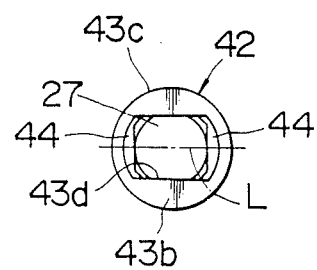
FIG. 5 is a plan view showing the relations between a member and a shaft portion of a spider.

In the limited slip differential 40, the shaft portion 27 of the spider 26 is supported by a washer 42. As shown in FIGS. 3 and 4, the washer 42 is constituted from an annular contacting portion 43a and a fitting portion 43b extending orthogonally to the contacting portion 43a and having a non-circular hole. The surface of the contacting portion 43a in contact with the pinion 16 and surface of the pinion 16 in contact with the contacting portion 43a constitute planes. As shown in FIG. 5, the fitting portion 43b has an outer peripheral surface 43c having a circular contour and an inner peripheral surface 43d in the form of a through hole. The inner peripheral surface 43d is formed generally into an elliptical or an elongated hole as viewed in a plan and a long axis L of the inner peripheral surface 43d extends in the same direction as the axes of the shafts 18, 20. The outer peripheral surface 43c of the fitting portion of the washer 42 is fitted in a hole 13a bored in the differential case 12.

On the other hand, an end of the shaft portion 27 of the spider 26 is formed into a generally rectangular section which is inserted into the hole of the washer 42. The end of the shaft portion 27 of the spider 26 is spaced apart from the inner peripheral surface 43d of the washer 42 to form gaps 44 in the direction of the long axis L, while the end of the shaft portion 27 is loosely fitted to the inner peripheral surface 43d without any substantial gap in the direction orthogonal to the long axis L. Accordingly, the spider 26 may be movable in the washer 42 axially of the shafts 18, 20 while the spider cannot be moved in the rotational direction orthogonal to the axes of the shafts, whereby a drive force is transmitted.

In the limited slip differential 40, spiral angles of the teeth of the side gears 14 and pinions 16 are determined such that each tooth of the side gear 14 disposed on the left side in FIG. 3 meshes with the convex surface of a tooth of each pinion 16, while each tooth of the side gear 14 disposed on the right side meshes with the concave surface of a tooth of each pinion 16 at the time of forward driving.

In the limited slip differential 40, the frictional force generating means 22 is constituted from eight clutch plates 30 disposed on the left side of the left side gear 14 and engaging unrotatably and axially movably the side gear 14, nine thrust washers 32 disposed on the left side of the left side gear 14 and engaging unrotatably and axially movably the differential case 12 and a thrust washer 34 disposed on the right side of the right side gear 14 and engaging unrotatably and axially movably the differential case 12.

Figure 6:
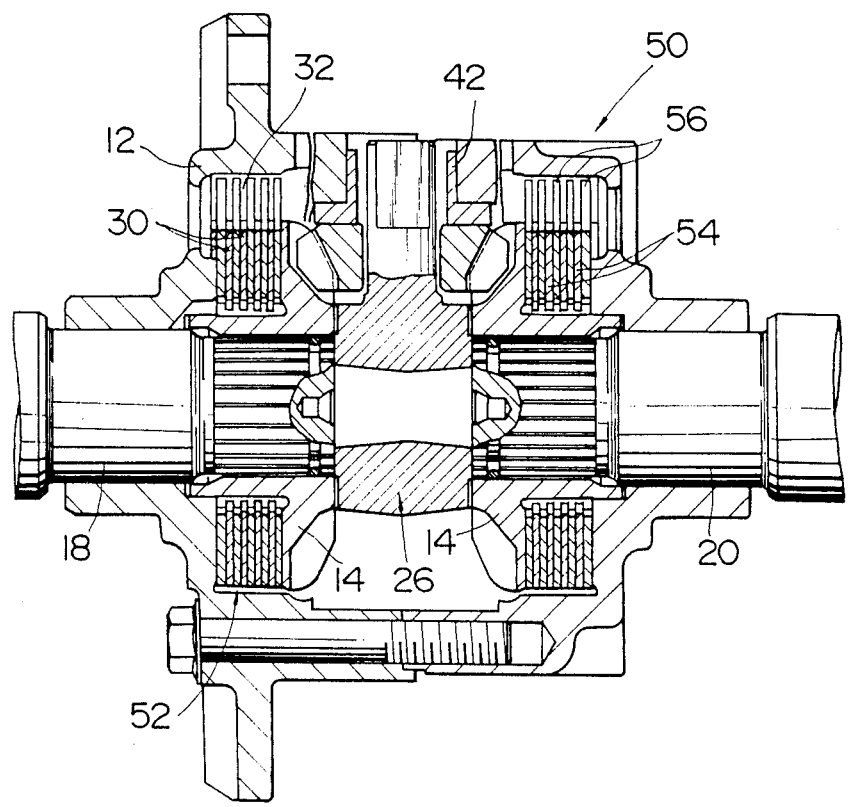
FIG. 6 is a sectional view illustrated in the same manner as in FIG. 1 according to a further embodiment of the limited slip differential.

In a limited slip differential 60 as shown in FIG. 6, frictional force generating means 52 is disposed to have left and right members equal with each other. That is, the frictional force generating means 52 is constituted from four clutch plates 30 disposed on the left side of the left side gear 14 and engaging unrotatably and axially movably the side gear 14, five thrust washers 32 disposed on the left side of the left side gear 14 and engaging unrotatably and axially movably the differential case 12, four clutch plates 54 disposed on the right side of the right side gear 14 and engaging unrotatably and axially movably an outer spline provided on the side gear 14 and five thrust washers 56 disposed on the right side of the right side gear 14 and engaging unrotatably and axially movably the differential case 12.

In the forward driving, a large thrust load is generated on the left side gear 14, each tooth of which meshes with the convex surface of a tooth of each pinion 16, while a small thrust load is generated on the right side gear 14, each tooth of which meshes with the concave surface of a tooth of each pinion 16. As a result, since a reversed load corresponding to a difference between the thrust loads as noted above is generated on the pinions 16, the spider 26 supporting the pinions 16 is moved in the washer 42 toward the right side gear 14 to press the pinions 16 against the right side gear 14.

When a pressure angle is assumed to be 22.5°, conical angle to be 58°, spiral angle of the spiral bevel gear to be 35° and tangential load on the pinion and side gear to be 1000 Kg, a theoretical value of the axial force acting on the side gear formed of a straight bevel gear is 351 Kg. On the contrary, when the side gear is formed of the spiral bevel gear, the axial force acting on the side gear meshing with the convex surface of each pinion results in a 803 Kg force while the axial force acting on the side gear meshing with the concave surface of each pinion results in a 51 Kg force.

Accordingly, when the frictional force generating means 22 is arranged as shown in FIG. 3, the differential limiting force at the time of forward driving results in 14,454 Kg, while the differential limiting force at the time of backward driving results in 14,454 Kg force. On the other hand, using straight bevel gears, 6,318 Kg of the differential limiting force is generated at the time of forward and backward driving by the frictional force generating means provided with a total of 18 clutch plates and thrust washers.

As has been described in the foregoing, according to the limited slip differential 40 as shown in FIG. 3, the thrust load on the left side gear is increased to about twice or more as large as that on the straight bevel gear at the time of advance driving, so that the differential limiting force is increased to about twice or more as large as that of the straight bevel gear. Further, the large thrust load generated on the right side gear acts at the time of engine braking and a reaction of the thrust load is applied to the left side gear through the pinions and spider as the axial force in accordance with force balancing. Therefore, the differential limiting frictional force corresponding to the axial force minus the frictional force between the spider and the torque transmitting portion of the washer is generated.

Furthermore, according to the limited slip differential 50 as shown in FIG. 6, since the frictional force generating means has members arranged equally left and right, the frictional force between the spider and the torque transmitting portion of the washer acts as a force reduction factor of the same axial forces of the side gears at the times of forward driving and engine braking. Therefore, the differential limiting frictional forces of the same size are generated at the time of forward driving and engine braking.

What is claimed is:

1. A limited slip differential comprising:
   a differential case;
   a pair of side gears formed of spiral bevel gears and disposed in said differential case;
   a plurality of pinions formed of spiral bevel gears meshing with the side gears, supported by portions of a spider and disposed in said differential case;
   frictional force generating means by which a differential motion generated between a pair of shafts respectively coupled with said side gears is limited; and
   means for preventing said spider and/or gears from wear resulting from such constitution of the side gears and pinion gears that the tooth surfaces on which each of the pinion meshes with said pair of side gears constitute a concave with respect to the tooth of the side gear on the side and a convex with respect to the tooth of the side gear on the other side,
   wherein said wear preventing means is a member for preventing each of the pinions from obtaining in a plane including points of contact between the pinion concerned and said pair of side gears and axes of said pair of shafts and is disposed between said pinion concerned and said differential case, each said member having an inner surface formed as a plane and an outer surface which is formed as a surface having an arc centering around axes of the paired shafts and ranging the arc axially;
   wherein said differential case has an inner surface opposed to the outer surface of said member, the inner surface of the differential case being formed as a surface having an arc centering around axes of the pair of shafts and ranging the arc axially, and
   wherein radii of the arcs of said members are substantially equal to one another and to that of the arc of said inner surface of said differential case.

2. A limited slip differential as claimed in claim 1, wherein the teeth of the pair of side gears are formed such as to be twisted in an opposite direction to those of said pinions.

3. A limited slip differential as claimed in claim 2, wherein said frictional force generating means comprises a plurality of clutch plates and a plurality of thrust washers in order to form frictional surfaces, the frictional surfaces being divided into one position between one side gear and the differential case and the other position between the other side gear and the differential case, and wherein the number of frictional surfaces on one position is different from that on the other position.

4. A limited slip differential as claimed in claim 3, wherein the number of frictional surfaces disposed in the position where a large thrust load generates on the side gear at the time of advance driving is more than the number of frictional surfaces disposed in the position where a small thrust load generates on the side gear at the time of advance driving.

5. A limited slid differential as claimed in claim 2, wherein said frictional force generating means comprises a plurality of clutch plates and a plurality of thrust washers in order to form frictional surfaces, the frictional surfaces being divided into one position between one side gear and the differential case and the other position between the other side gear and the differential case, and wherein the number of frictional surfaces on one position is the same as that on the other position.

6. A limited slip differential as claimed in claim 1, wherein said member has a portion disposed between said shaft portion of said spider and said differential case and supporting said spider to be movable in the axial direction of the shafts.

7. A limited slip differential as claimed in claim 6, wherein said portion of the member has an inner peripheral surface generally formed into an elliptical shape as viewed in a plan, a long axis of the surface extending in the same direction as axes of the shafts, and wherein an end of each shaft portion of the spider is formed to have a generally rectangular section and is inserted into the support member movably in the direction of the long axis.

* * * * *